(12) United States Patent
Gao

(10) Patent No.: US 8,570,718 B2
(45) Date of Patent: Oct. 29, 2013

(54) PORTABLE ELECTRONIC DEVICE WITH PENDANT ATTACHMENT DEVICE

(75) Inventor: Yan-Ling Gao, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 61 days.

(21) Appl. No.: 13/421,311

(22) Filed: Mar. 15, 2012

(65) Prior Publication Data

US 2013/0163151 A1    Jun. 27, 2013

(51) Int. Cl.
*H05K 5/00* (2006.01)
*H05K 7/00* (2006.01)
*G06F 1/16* (2006.01)
*A45F 3/14* (2006.01)
*H04M 1/00* (2006.01)

(52) U.S. Cl.
USPC ............. 361/679.01; 361/679.3; 361/679.56; 455/575.1; 224/254

(58) Field of Classification Search
USPC .......... 361/679.01, 679.3, 679.56; 455/575.1; 224/254
See application file for complete search history.

(56) References Cited

U.S. PATENT DOCUMENTS

| 5,724,667 A * | 3/1998 | Furuno ..................... 455/575.2 |
| 7,929,297 B2 * | 4/2011 | Chen ........................ 361/679.56 |
| 8,068,332 B2 * | 11/2011 | Yang et al. ............... 361/679.01 |
| 8,199,492 B2 * | 6/2012 | Liang et al. ............. 361/679.56 |
| 8,224,404 B2 * | 7/2012 | Yang et al. ................ 455/575.1 |
| 8,300,388 B2 * | 10/2012 | Li ............................ 361/679.01 |
| 2010/0014246 A1 * | 1/2010 | Chen ........................ 361/679.56 |
| 2010/0102576 A1 * | 4/2010 | Zhang ........................... 292/261 |
| 2010/0118476 A1 * | 5/2010 | Li ............................ 361/679.01 |
| 2010/0226078 A1 * | 9/2010 | Liang et al. ............. 361/679.01 |

* cited by examiner

*Primary Examiner* — Anthony Haughton
(74) *Attorney, Agent, or Firm* — Altis & Wispro Law Group, Inc.

(57) ABSTRACT

A portable electronic device includes a housing defining an opening, a string of a pendant, and a pendant attachment device. The pendant attachment device includes a fixing block, an attachment element rotatably and movably fixed in the compartment, a fixing plate fixed to the housing and an elastic element. The fixing block defines a compartment. The attachment element includes a main body defining a fixing hole, the string is threaded through the fixing hole. In a first state, the elastic element exerts an elastic force on the attachment element, causing the attachment element being latched with the latching block with the fixing hole is located in the opening. In a second state, the elastic element drives the attachment element to move away from the fixing plate, thereby making the fixing hole stick out of the opening.

18 Claims, 5 Drawing Sheets

PORTABLE ELECTRONIC DEVICE WITH PENDANT ATTACHMENT DEVICE

BACKGROUND

1. Technical Field

The exemplary disclosure generally relates to portable electronic devices, particularly to portable electronic devices with a pendant attachment device.

2. Description of Related Art

Mobile phone users often attach decorative pendants to their phones. The pendants generally hang from an attachment element, such as a string or chain looped through a dedicated hole or ligament of the mobile phone. However, because the hole is usually small it can be difficult to thread the attachment element through the hole to attach the pendants.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary portable electronic device with a pendant attachment device. Moreover, in the drawings like reference numerals designate corresponding parts throughout the several views. Wherever possible, the same reference numbers are used throughout the drawings to refer to the same or like elements of an embodiment.

DETAILED DESCRIPTION

In this exemplary embodiment, the device is an electronic device such as a mobile telephone but any device to which a pendant can be attached is applicable. Accordingly, any reference herein to the mobile telephone should also be considered to apply equally to other portable devices.

Figure 1:
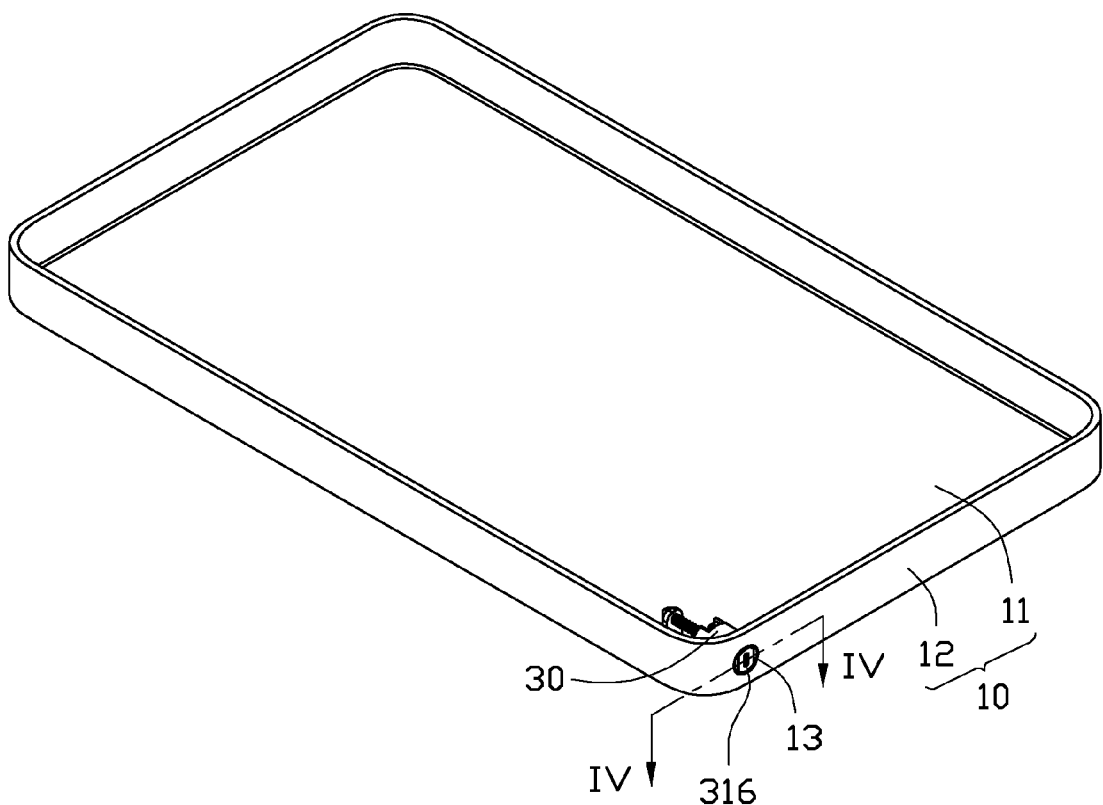
FIG. 1 is a schematic view of an exemplary embodiment of portable electronic device including a pendant attachment device in a first state.
Figure 5:
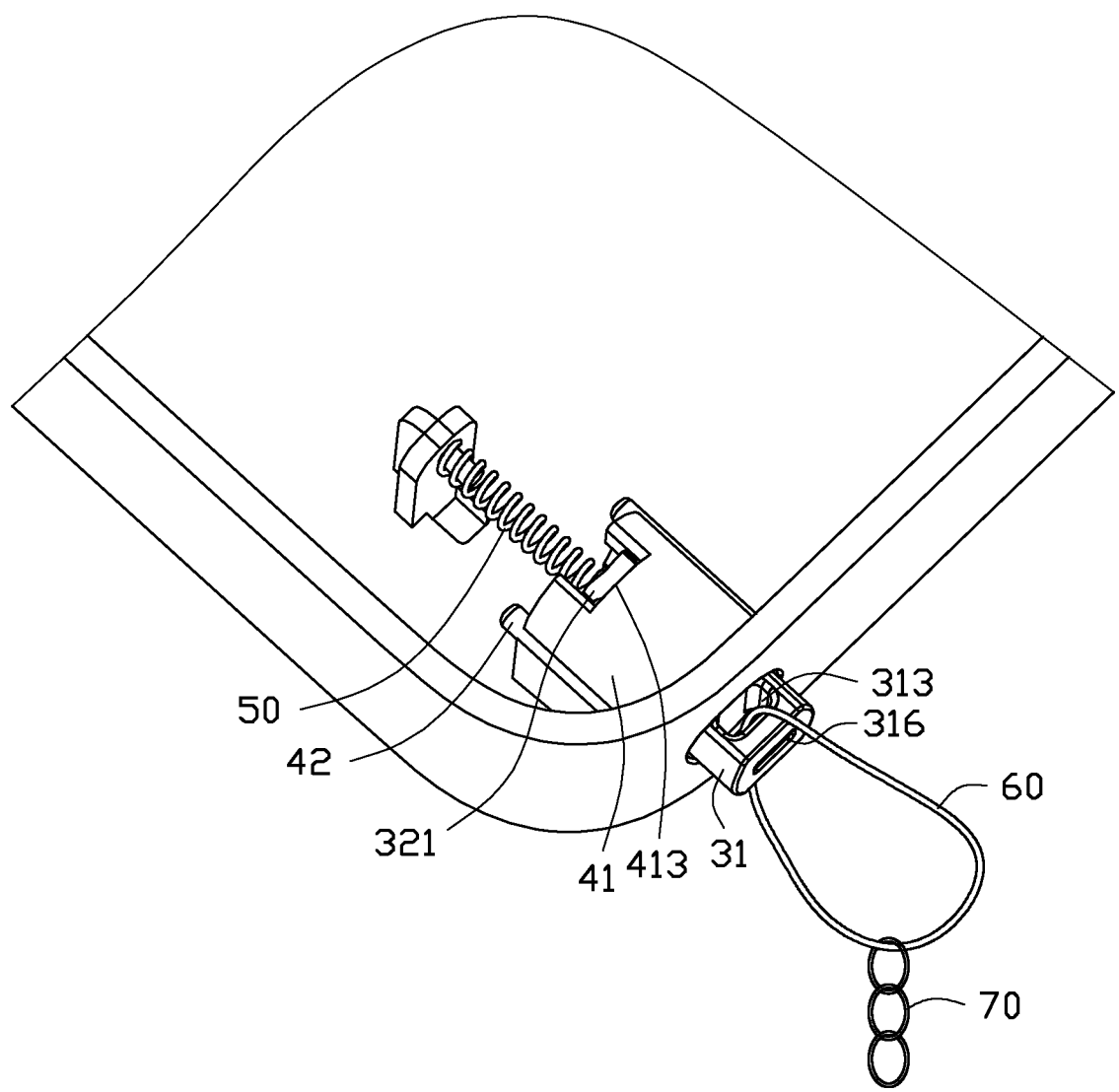
FIG. 5 is similar to FIG. 3, but showing the portable electronic device in a second state.

Referring to FIG. 1, the exemplary device 100 includes a housing 10, a pendant attachment device 20 and a string 60 of a pendant 70 (FIG. 5). The housing 10 includes a main board 11 and a sidewall 12 protruding from an edge of the main board 11. An opening 13 is defined in the sidewall 12.

Figure 2:
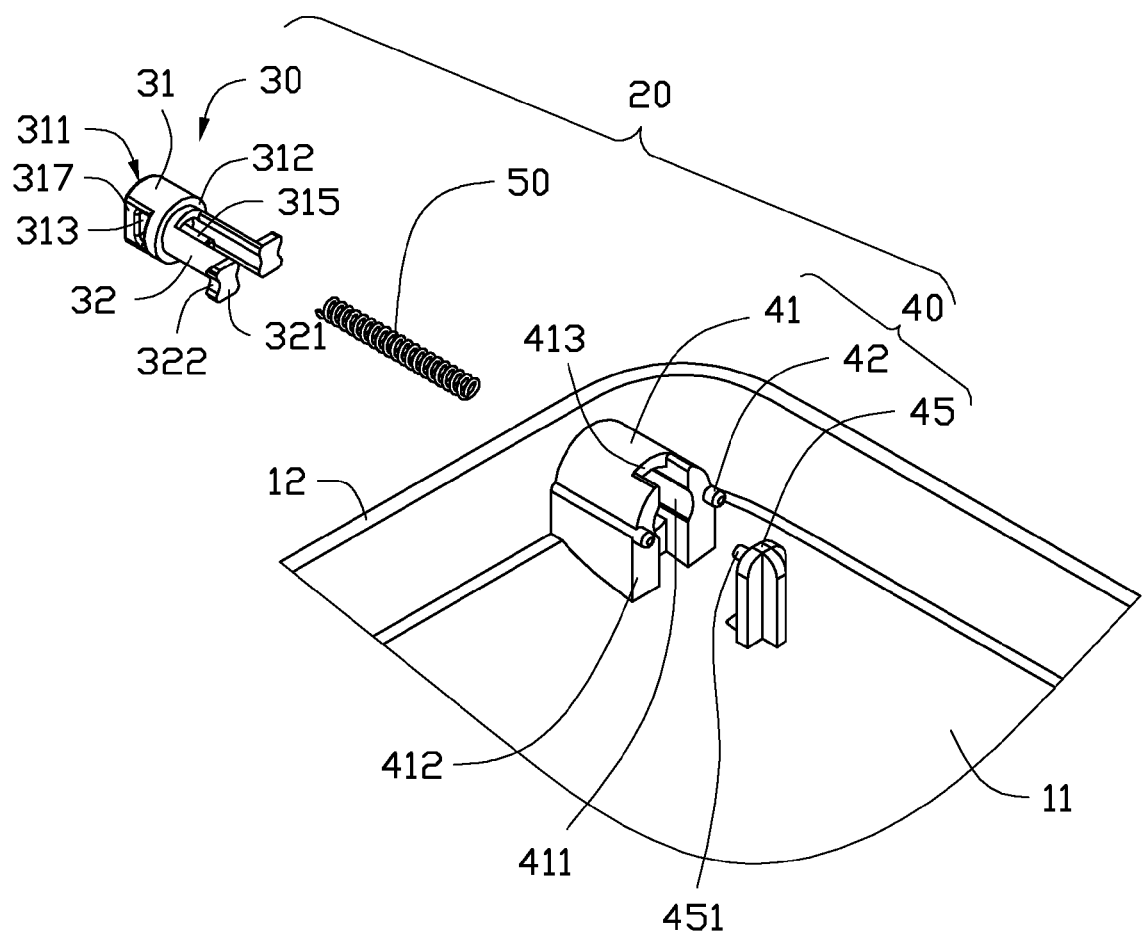
FIG. 2 is an exploded and partially enlarged view of the portable electronic device from another aspect.

Referring to FIG. 2, the pendant attachment device 20 includes an attachment element 30, a fixing element 40 and an elastic element 50. The attachment element 30 includes a main body 31 and two latching members 32. The main body 31 includes a first end 311, a second end 312, a fixing hole 313 and a first retaining post 315. The first end 311 is opposite to the second end 312. A slot 316 is defined in the first end 311 of the main body 31, facilitating rotating the attachment element 30. The main body 31 further defines two notches 317 at two sides of the main body 31. The fixing hole 313 is defined between the first end 311 and the second end 312, and communicates with the notches 317. The latching members 32 protrude from the second end 312 and opposite to each other. The latching members 32 can move away from or toward each other. A hook 321 protrudes from a distal end of each latching member 32. Each hook 321 defines a latching groove 322 opposite to the other hook 321. The first retaining post 315 protrudes from the second end 312 and is located between the latching members 32.

The fixing element 40 includes a fixing block 41, two limiting posts 42 and a fixing plate 45. The fixing block 41 is fixed to the main board 11 and includes a latching end 412 opposite to the sidewall 12 of the housing 10. The fixing block 41 longitudinally defines a compartment 411 communicating with the opening 13. The fixing block 41 further defines two cutouts 413 in the latching end 412 and located at two sides of the compartment 411. The limiting posts 42 protrude from the latching end 412 and located at another two sides of the compartment 411. The fixing plate 45 protrudes from the main board 11 spaced from and aligned with the compartment 411. The fixing plate 45 includes a second retaining post 451 protruding from a surface of the fixing plate 45 facing the fixing element 40.

The elastic element 50 may be a compression spring. The elastic element 50 is fixed between the attachment element 30 and the fixing plate 45 to exert an elastic force to the attachment element 30 so the attachment element 30 can move away from the fixing plate 45 under the elastic force of the elastic element 50. In this exemplary embodiment, one end of the elastic element 50 is fixed to the first retaining post 315, the other end of the elastic element 50 is fixed to the second retaining post 451.

Figure 3:
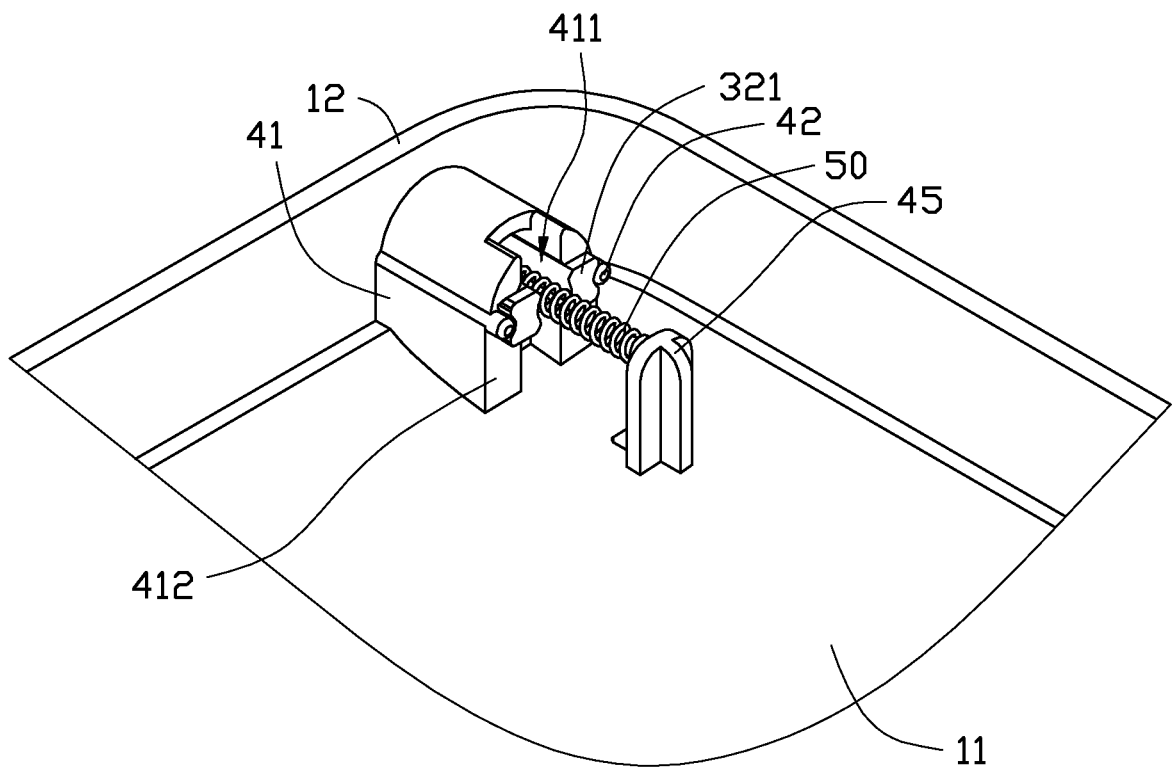
FIG. 3 is an assembled view of the portable electronic device of FIG. 2.
Figure 4:
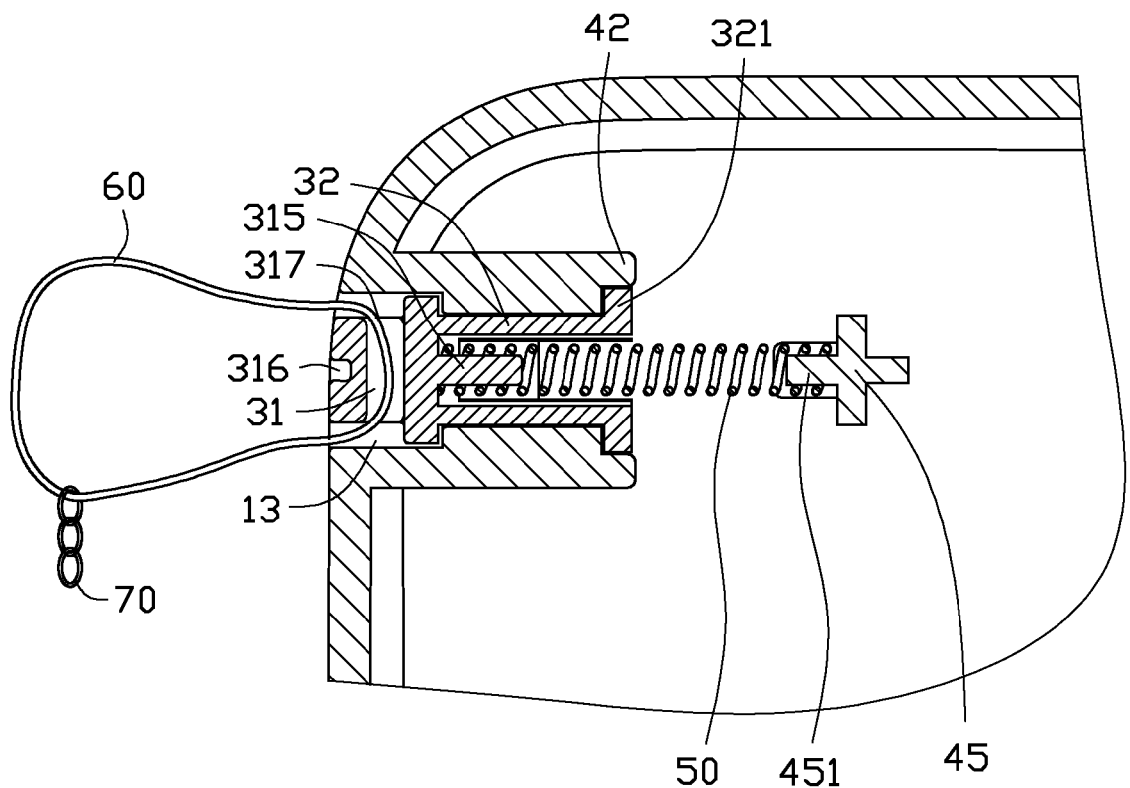
FIG. 4 is a cross sectional view of the portable electronic device shown in FIG. 1, but a pendant is hung on the portable electronic device.

Referring to FIGS. 3 and 4, in assembly, one end of the elastic element 50 is fixed to the second retaining post 451. The string 60 is threaded through the fixing hole 313 and looped so the pendant 70 is hung on the attachment element 30. The attachment element 30 enters into the compartment 411 from the opening 13 toward the fixing plate 45, making the other end of the elastic element 50 being fixed to the first retaining post 315. The attachment element 30 continuously moves until the hooks 321 move over the limiting posts 42, the elastic element 50 is compressed. The attachment element 30 rotates until the latching grooves 322 are aligned with the limiting posts 42. The attachment element 30 is released, then the elastic element 50 decompresses to drive the attachment element 30 move away from the fixing plate 45 until the limiting posts 42 are latched in the latching grooves 322. At this time, the pendant attachment device 20 is kept in a first state (as shown in FIG. 4) by the elastic force of the elastic element 50, the main body 31 of the attachment element 30 is located in the opening 13 to improve the portability of the portable electronic device 100, and the pendant 70 is hung on and decorate the portable electronic device 100.

Referring to FIG. 5, to detach the pendant 70, a tool (not shown), such as a screwdriver, is inserted into the slot 316 and drive the attachment element 30 to move toward the fixing plate 45. After the limiting posts 42 are released out of the latching grooves 322, the tool is rotated to drive the attachment element 30 to rotate until the hooks 321 are aligned with the cutouts 413. The attachment element 30 is released so the attachment element 30 move away from the fixing plate 45 under the elastic force of the elastic element 50 until the hooks 321 move into the cutouts 413. At this time, the pendant attachment device 20 is in a second state, wherein the fixing hole 313 is exposed out of the housing 10, facilitating detaching the pendant 70.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device, comprising:
a housing defining an opening; and
a pendant attachment device comprising:
a fixing block fixed to the housing, the fixing block defining a compartment communicating with the opening;
an attachment element rotatably and movably fixed in the compartment, the attachment element including a main body defining a fixing hole for a string of a pendant to pass through, the fixing hole being located in the opening;
a fixing plate fixed to the housing and aligned with the compartment;
an elastic element fixed between the fixing plate and the attachment element;
wherein the elastic element exerts an elastic force on the attachment element to drive the attachment element to move away from the fixing plate, thereby making the fixing hole be exposed out of the opening.

2. The portable electronic device as claimed in claim 1, wherein the fixing block including two limiting posts, the attachment element further includes two latching members protruding from the main body; each latching member defines a latching groove, each limiting post is latched in one of the latching grooves causing the attachment element being latched with the latching block in the first state.

3. The portable electronic device as claimed in claim 2, wherein the main body includes a first end; a slot is defined in the first end, facilitating rotating the attachment element.

4. The portable electronic device as claimed in claim 3, wherein the main body further includes a second end opposite to the first end; the latching members protrude from the second end.

5. The portable electronic device as claimed in claim 4, wherein a hook protrudes from a distal end of each latching member, each hook defines one of the latching grooves opposite to the other hook.

6. The portable electronic device as claimed in claim 4, wherein a first retaining post protrudes from the second end between the latching members, a second retaining post protrudes from a surface of the fixing plate facing the fixing element; one end of the elastic element is fixed to the first retaining post, the other end of the elastic element is fixed to the second retaining post.

7. The portable electronic device as claimed in claim 4, wherein the housing includes a main board and a sidewall protruding from an edge of the main body, the fixing block is fixed to the main board.

8. The portable electronic device as claimed in claim 7, wherein the fixing block includes a latching end opposite to the sidewall, two cutouts are defined in the latching end and located at two sides of the compartment; in the second state, the elastic element drives the attachment element to move into the cutouts, thereby making the fixing hole out of the opening.

9. The portable electronic device as claimed in claim 8, wherein the limiting posts protrude from the latching end and located another two sides of the compartment.

10. A portable electronic device, comprising:
a housing defining an opening; and
a pendant attachment device comprising:
a fixing block fixed to the housing, the fixing block defining a compartment communicating with the opening;
an attachment element rotatably and movably fixed in the compartment, the attachment element including a main body defining a fixing hole for a string of a pendant passing through;
a fixing plate fixed to the housing and aligned with the compartment;
an elastic element fixed between the fixing plate and the attachment element;
wherein the attachment element is latched with the fixing block to make the fixing hole is located in the opening; after the attachment element is released from the latching block, the attachment element is capable of rotating relative to the latching block, and the elastic element drives the attachment element to move away from the fixing plate, thereby making the fixing hole be exposed out of the opening.

11. The portable electronic device as claimed in claim 10, wherein the fixing block including two limiting posts, the attachment element further includes two latching members protruding from the main body; each latching member defines a latching groove, each limiting post is latched in one of the latching grooves causing the attachment element being latched with the latching block in the first state.

12. The portable electronic device as claimed in claim 11, wherein the main body includes a first end; a slot is defined in the first end, facilitating rotating the attachment element.

13. The portable electronic device as claimed in claim 11, wherein the main body further a second end opposite to the first end; the latching members protrude from the second end.

14. The portable electronic device as claimed in claim 13, wherein a first retaining post protrudes from the second end between the latching members, a second retaining post protrudes from a surface of the fixing plate facing the fixing element; one end of the elastic element is fixed to the first retaining post, the other end of the elastic element is fixed to the second retaining post.

15. The portable electronic device as claimed in claim 13, wherein a hook protrudes from a distal end of each latching member, each hook defines one of the latching grooves opposite to the other hook.

16. The portable electronic device as claimed in claim 15, wherein the housing includes a main board and a sidewall protruding from an edge of the main body, the fixing block is fixed to the main board.

17. The portable electronic device as claimed in claim 16, wherein the fixing block includes a latching end opposite to the sidewall, two cutouts are defined in the latching end and located at two sides of the compartment; the attachment element rotates relative to the latching block till after the hooks are aligned with the cutouts, the elastic element drives the attachment element to move into the cutouts, thereby making the fixing hole be exposed out of the opening.

18. The portable electronic device as claimed in claim 17, wherein the limiting posts protrude from the latching end and located another two sides of the compartment.

* * * * *